July 9, 1935.  H. L. KRAEFT  2,007,203
COMBINED BATTERY HOLDER AND SWITCH
Filed April 5, 1933
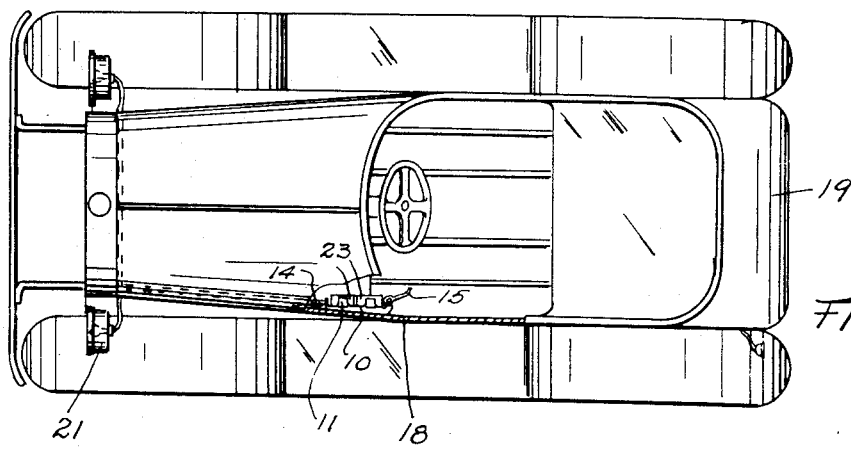
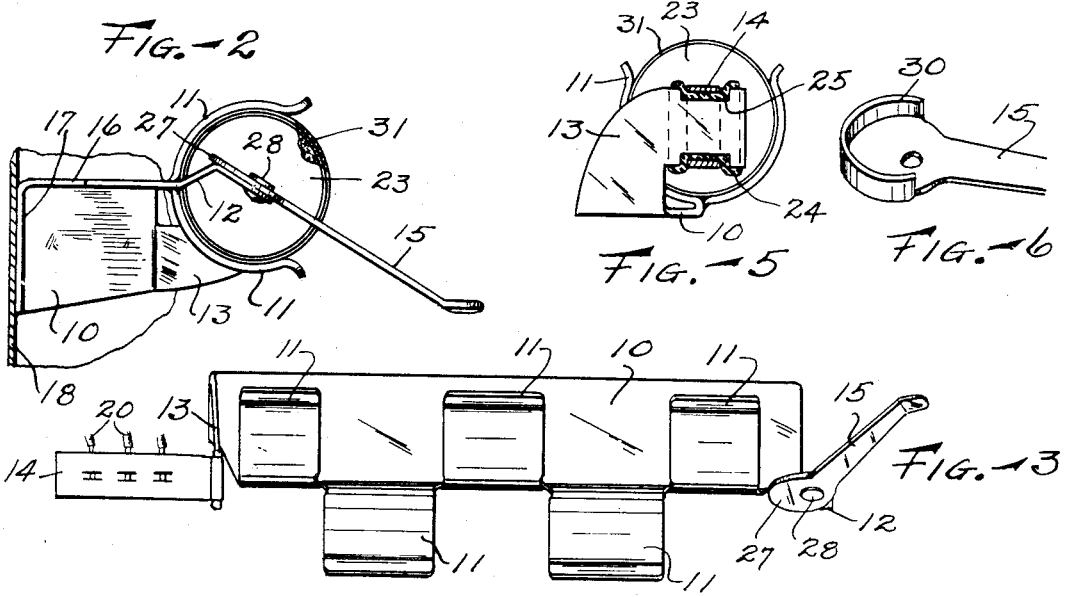
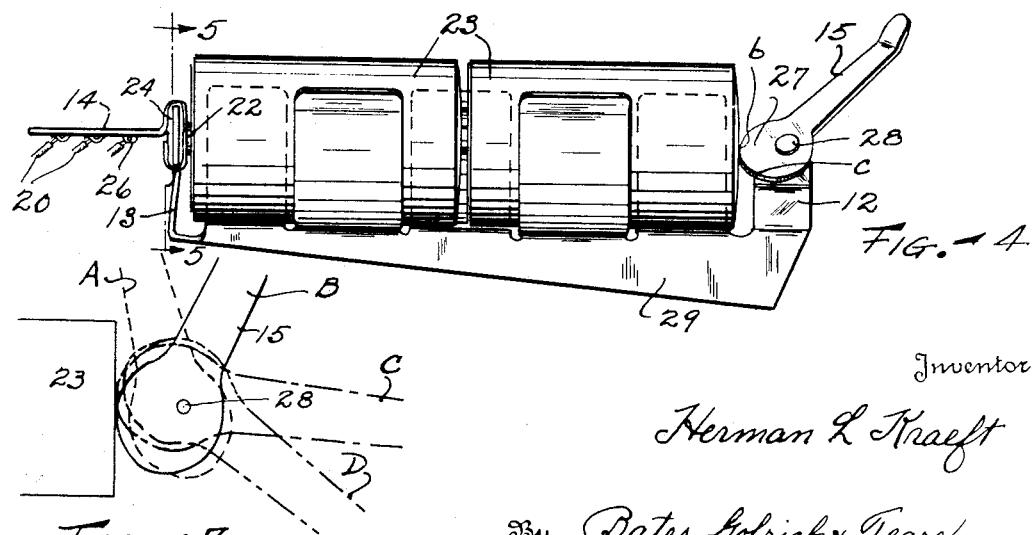
Inventor
Herman L Kraeft
By Bates, Golrick & Teare
Attorneys Patented July 9, 1935

2,007,203

UNITED STATES PATENT OFFICE 2,007,203

COMBINED BATTERY HOLDER AND SWITCH

Herman L. Kraeft, Cleveland, Ohio, assignor to Murray-Ohio Manufacturing Company, a corporation of Ohio Application April 5, 1933, Serial No. 664,529

3 Claims. (Cl. 136—173)

This invention relates to a combined battery holder and switch, and especially to a simple, compact holder for retaining a dry cell battery unit, with a switch integral at one end and a contact terminal at the other end to which wires may be attached for operating a light, signal or other similar electrical accessory.

The general object of the invention is to provide the simple and fool-proof unit which may be readily attached to a child's vehicle or toy, the construction being such that it may be used in widely varying positions in most any type of vehicle.

A more specific object is to provide a unit with as few parts as possible, thus contributing to its ease of manufacture and its dependability when in use. The device is also easily secured to the frame of a vehicle so that the manufacture and assembly adds very little to the cost of the toy or vehicle, due to the added electrical equipment.

Other objects of the invention will become apparent from the following description, reference being had to the accompanying drawing, and the essential features of the invention will be set forth in the claims.

In the drawing, Fig. 1 is a plan view of a child's toy, being a miniature automobile partly broken away to illustrate the general location of the combined battery holder and switch in connection with electrical accessories, such as lights upon the automobile; Fig. 2 is an end view, partly in section; Fig. 3 a plan view; and Fig. 4 a side elevation of the device; Fig. 5 is a sectional view along the line 5—5 of Fig. 4; Fig. 6 is a partial perspective view of a modified form of the switch member; while Fig. 7 is a diagrammatic representation of various positions of the switch member.

In general, the device comprises a longitudinally extending bracket 10, a plurality of transversely extending arms 11, rigidly connected with the bracket and adapted to hold a dry battery unit 23, and projections 12 and 13 at opposite ends of the bracket, one of which, as at 13, supports a contact terminal or wire-attaching member 14 and the other of which, as at 12, supports a switch 15 for opening and closing the circuit. The device is preferably formed of a metal having resilient characteristics, such as steel, and the parts 10, 11, 12 and 13 are preferably struck up from one piece of metal.

The bracket 10 is shown as being L-shaped in section, as best seen in Fig. 2, with a horizontal leg 16 and a vertical leg 17, although it will be understood that the bracket may be given any form best suited for the attachment desired. To a frame member 18 of the vehicle 19 bracket 10 may be attached in any known manner, but I prefer to spot-weld the parts together, as this provides a simple and effective attachment, as well as one giving a dependable electric circuit. This circuit has been arranged in a very simple manner, the current flowing from one pole 22 of the battery, through the member 14, thence through a wire 20 to one terminal of an electrical device 21, the other terminal of which is grounded on the frame 18. The current then travels along the frame to the bracket member 10, through the projection 12 and the switch 15, which, in the contact closing position, will complete the circuit with the other pole of the battery.

To prevent a short circuiting of the battery through the bracket, the battery is insulated from the arms 11 by the usual casing cover 31 and the terminal 22 of the battery, which contacts the wire-attaching member 14, is insulated from the bracket, as shown in Figs. 4 and 5. The projection 13 is provided with an insulating strip 24 about which the member 14 may be bent. The member 14 is preferably a deformable metal of high conductivity, such as copper, and the projection 13 may be provided with a notch, as at 25, substantially corresponding in width to the metal strip 14, whereby, when the metal strip is bent about the insulation 24, it retains the parts simply but effectively in place within the notch. The member 14 may be provided with struck-up tongues 26 for attachment of the wires quickly and without solder.

The battery-supporting arms 11 may be arranged in any desired manner along the length of the bracket, but are shown in a staggered relation for the double purpose of economizing in metal, and to provide an overlapping support where, as shown, the battery 23 consists of two or more units.

The switch 15 may be a substantially flat metallic strip having an arcuate head 27 eccentrically pivoted as at 28 to the projection 12. The arrangement of the arcuate edge 27 and the pivot 28 is such that in one position the switch member contacts the metallic casing of the battery 23 and in another position such contact is broken. Preferably, I arrange the switch so that in the position A, Fig. 7 the contact is open, at B the contact is closed by the switch head touching the battery casing at $b$ (see Fig. 4), from B to C the periphery of the switch head is an increasing cam forcing the battery toward the contact terminal 14, the position of maximum pressure being shown at C, while at D the arc diminishes until the contact is again open. Such a construction has advantages, as it insures definite contact being made, it permits the device to be mounted in various positions where the switch may be operated in either direction, and also because the device is designed to be operated by a child who is likely to force it in either direction. The spacing between the projections 12 and 13 is such that with any standard size battery in place the movement of the switch 15 to the contact-making position forces the battery units together (if multiple cells are used) and in any case forces the terminal 22 against the member 14 carried by the projection 13. No springs are necessary, as the slight yielding resistance required is furnished by the natural resilience of the metal projections 12 and 13.

To provide operating space for the switch I have shown the switch-carrying end of the bracket 10 as spaced away from the vehicle by a widening of one leg of the bracket support as at 29, so as to hold the switch member away from the frame. If desired, the entire battery could be held at this distance from the frame, but I prefer to keep the other end of the battery adjacent the frame support as illustrated in Fig. 4, so as to conserve space and metal, and to make the wire attachments lie close to the frame along which they run.

Fig. 6 illustrates a modification of the switch member 15, wherein the arcuate contact-making head is provided with an upstanding arcuate flange 30, thus giving a greater area of contact against the battery and preventing damage to the battery casing through constant use.

I claim:

1. A combined battery holder and switch comprising a bracket of resilient metal, arms struck up from the metal of the bracket intermediate the ends thereof, said arms being bent outwardly in opposite directions to embrace a dry battery, projections struck up from opposite ends of the bracket, a wire-attaching member carried by one of said projections and insulated therefrom, and a manually operable switch member carried by the other of said projections, said switch member having an arcuate head pivoted eccentrically on the last-named projection, said head in one position being out of engagement with the battery and in another position pressing said battery against the wire-attaching member carried by the first-named projection.

2. In combination, a bracket, an electrical battery supported thereby, said battery having terminals at opposite ends thereof, an electrical circuit connection contacting one terminal, said connection being insulated from the bracket, a manually operable switch member adjacent the other end of said bracket, said switch member having a head with an arcuate periphery, the head being pivotally supported eccentric of said arc, and the periphery of said head being provided with an upstanding arcuate flange.

3. A combined holder and switch mechanism for cylindrical batteries, comprising longitudinally extending thin metallic web having upwardly extending arms arranged to embrace a plurality of batteries simultaneously and retain them in axial alignment with the other and in the plane of the said web, said web having upstanding integral legs at its opposite ends in axial alignment with said batteries, one of said legs being in a plane normal to the axis of said batteries, whereby it may yield in a direction parallel to the axis of the batteries, said leg being provided with an electrical contact, means to electrically insulate said contact from said member, the other leg being provided with a manually operable switch member eccentrically pivoted thereon, said last-named leg extending in a plane parallel with the axis of said batteries to provide a substantially rigid pivotal mounting for said switch member and wherein the switch member may be moved into contact with the batteries and when so moved acts to move the batteries axially into contact with each other and said contact member.

HERMAN L. KRAEFT.